United States Patent
Choyi et al.

(10) Patent No.: US 12,513,134 B2
(45) Date of Patent: Dec. 30, 2025

(54) METHOD AND SYSTEM FOR APPLICATION AUTHORIZATION FOR NETWORK SLICES

(71) Applicant: Verizon Patent and Licensing Inc., Basking Ridge, NJ (US)

(72) Inventors: Vinod Kumar Choyi, Conshohocken, PA (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 182 days.

(21) Appl. No.: 18/479,301

(22) Filed: Oct. 2, 2023

(65) Prior Publication Data

US 2025/0112908 A1 Apr. 3, 2025

(51) Int. Cl.
*H04L 9/40* (2022.01)
(52) U.S. Cl.
CPC ........ *H04L 63/0823* (2013.01); *H04L 63/083* (2013.01); *H04L 63/10* (2013.01)
(58) Field of Classification Search
CPC .................................................. H04L 63/0823
See application file for complete search history.

(56) References Cited

U.S. PATENT DOCUMENTS

| | | | | |
|---|---|---|---|---|
| 2020/0028842 | A1* | 1/2020 | Leiserson | H04L 9/3268 |
| 2022/0141192 | A1* | 5/2022 | Silveira | H04L 63/0823 |
| | | | | 726/15 |
| 2022/0182835 | A1* | 6/2022 | Rajput | H04L 9/0891 |
| 2023/0049987 | A1* | 2/2023 | Qiu | H04W 12/069 |

* cited by examiner

Primary Examiner — Hee Soo Kim (57) ABSTRACT

A method, a network device, and a non-transitory computer-readable storage medium are described in relation to an application authorization service. The application authorization service may be performed at an end device and invoked responsive to the launching of an application. The application authorization service may include validating an application certificate associated with the application, validating an attestation value, and validating a token provided by the application. The application may provide a request that includes an application identifier and a token. The application may be granted access to a network or denied access depending on the outcome of the validation procedures. The granted access may include assignment of a network slice. The application certificate, a secured token, and a secured attestation value may be stored in a secure environment at the end device and used for validation procedures.

20 Claims, 8 Drawing Sheets

METHOD AND SYSTEM FOR APPLICATION AUTHORIZATION FOR NETWORK SLICES

BACKGROUND

An end device may host various types of applications. The end device may connect to a network that may support an application session of an application. In a Fifth Generation (5G) network environment, the end device may select a network slice that supports the application.

DETAILED DESCRIPTION

The following detailed description refers to the accompanying drawings. The same reference numbers in different drawings may identify the same or similar elements. Also, the following detailed description does not limit the invention.

End devices or user equipment (UEs) may host one or multiple applications. For example, the application may relate to tactile Internet, augmented reality (AR), virtual reality (VR), email, instant messaging, web browsing, voice, video calling, video conferencing, video streaming, gaming, a fitness service, a navigation service, and/or another type of application or application service. In a 5G network environment, for example, some applications may be allowed to use a network slice. The network slice may provide or afford a certain quality of service (QOS) and security guarantees. One end of the network slice may terminate at the end device.

Unfortunately, an application may seek access to a network slice, or more generally the network, even though the application may not be authorized to do so. As such, an unauthorized and/or malicious application (referred to herein simply as "unauthorized" application) may unnecessarily overload resources of the network and/or the end device which may negatively impact other authorized and/or non-malicious applications that may use the same network slice or another network slice. When granted access to the network, the unauthorized application may be able to steal data that belongs to the network slice, waste network resources in the control and user planes, diminish revenue for a network operator or other type of entity, among other things.

According to exemplary embodiments, an application authorization service is described. According to an exemplary embodiment, the application authorization service is provided by an end device. According to an exemplary embodiment, the application authorization service may be invoked in response to the execution of the application. According to an exemplary embodiment, the application authorization service may include validating a certificate of the application, as described herein. For example, the application authorization service may validate a certificate authority (CA) associated with the certificate, an expiration date of the certificate, an application identifier, and/or other values indicated by the certificate, as described herein. According to an exemplary embodiment, the application authorization service may include validating an attestation value of the application, as described herein. For example, the application authorization service may compare attestation values to determine whether the application is associated with, owns, or belongs to the application identifier and the certificate, as described herein. According to an exemplary embodiment, the application authorization service may validate a token associated with the application, as described herein. For example, the application authorization service may compare tokens to determine if the application is authorized access to and use of a network slice, as described herein. According to an exemplary embodiment, the application authorization service may grant or deny the application access to a network slice or a network connection depending on the outcome of a procedure performed by the application authorization service.

In view of the foregoing, the application authorization service may prevent an unauthorized application to connect to a network and/or use a network slice. Consequently, the application authorization service may prevent the unauthorized application wasting resources in the network and at the end device, and may improve network and end device performance for authorized applications.

Figure 1:
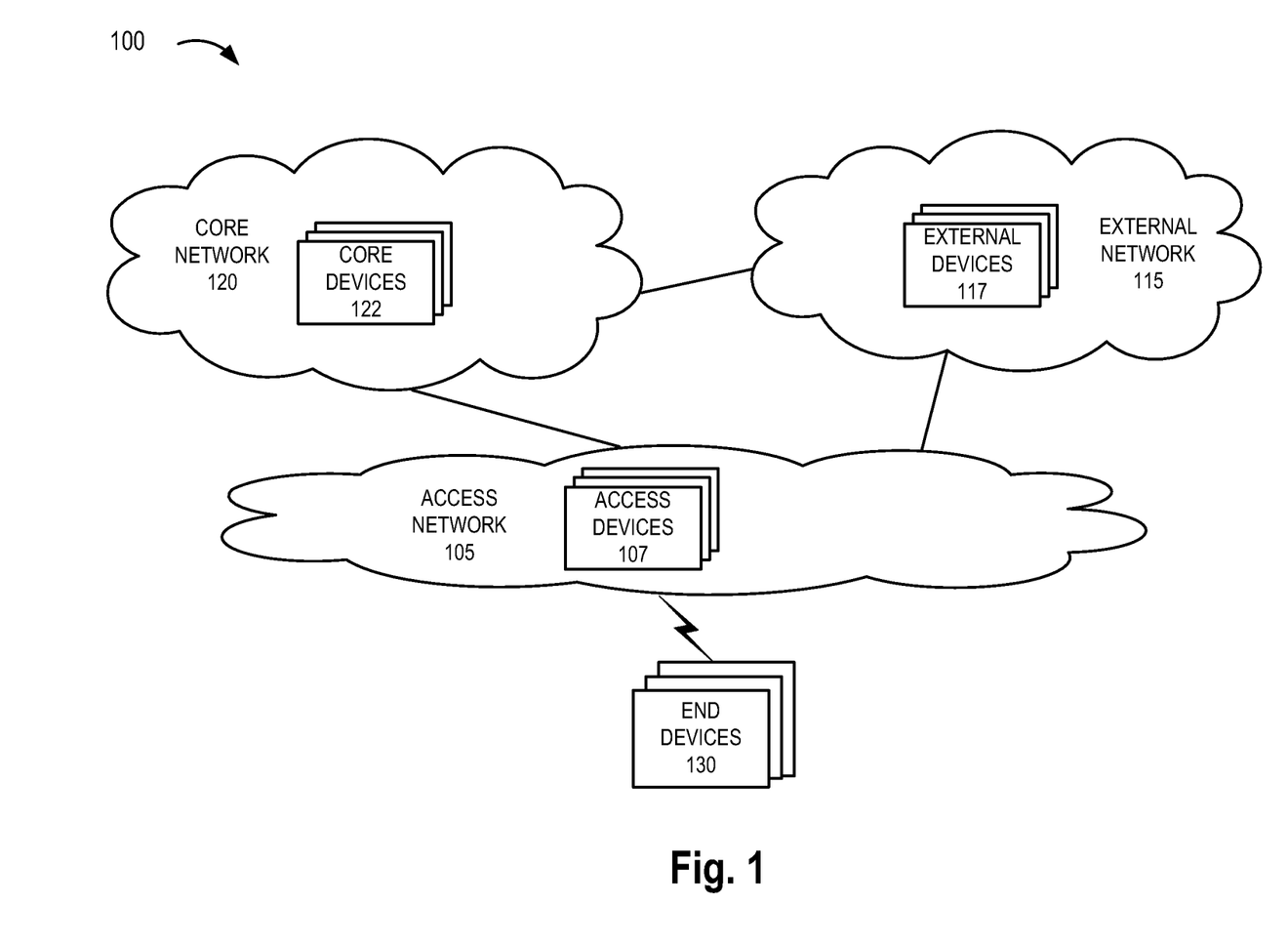
FIG. 1 is a diagram illustrating an exemplary environment in which an exemplary embodiment of an application authorization service may be implemented.

FIG. 1 is a diagram illustrating an exemplary environment 100 in which an exemplary embodiment of an application authorization service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary. Environment 100 may include various planes of communication including, for example, a control plane (CP), a user plane (UP), and a network management plane. Environment 100 may include other types of planes of communication.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station). Access device 107 may include other types of wireless access devices, such as a Wi-Fi device, a WiMax device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. External devices 117 may host one or multiple types of application services. For example, the application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. Each of the exemplary application services described may also have an end device-side application hosted by end device 130, for example.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging function (CHF), and/or a charging system (CS).

End device 130 may include a device that may have computational and communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a music device, an Internet of Things (IoT) device, a drone, a smart device, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, end device 130 may include logic of an exemplary embodiment of the application authorization service. According to an exemplary embodiment, the application authorization service may provide an application certificate validation procedure. For example, the application certificate validation procedure may verify that a certificate of an application is genuine. The application authorization service may determine whether the certificate is signed by a valid certificate authority, whether the certificate has expired or not, whether the application identifier of the application is valid, among other verifications, as described herein.

According to an exemplary embodiment, the application authorization service may provide an application attestation procedure. For example, the application attestation procedure may verify whether an application identifier and the certificate belong to, are owned by, or pertain to the application. According to exemplary embodiment, the application attestation procedure may include comparing an attestation value included in the certificate to another attestation value generated by the end device, as described herein.

According to an exemplary embodiment, the application authorization service may provide a token validation procedure. For example, the token validation procedure may determine whether the application is authorized to connect to a network slice, and if so, to which network slice the application may connect. According to an exemplary embodiment, the token validation procedure may include comparing a token (e.g., an authorization token) obtained from the application to a token (e.g., an authorization token) stored by the end device in a secured element, as described herein. According to an exemplary embodiment, the token may include a network slice identifier of a network slice (e.g., network slice selection assistance information (NS-SAI)), QoS information (e.g., a 5G QoS Identifier (5QI) or the like), a combination of both, and/or other information pertaining to a non-network slice network connection (e.g., parameters relating to security, service level agreement (SLA) requirements, QoS, an application identifier, an application type, or the like). According to an exemplary embodiment, the application authorization service may be triggered or invoked upon the launching, startup, or initial execution of the application.

Figure 2:
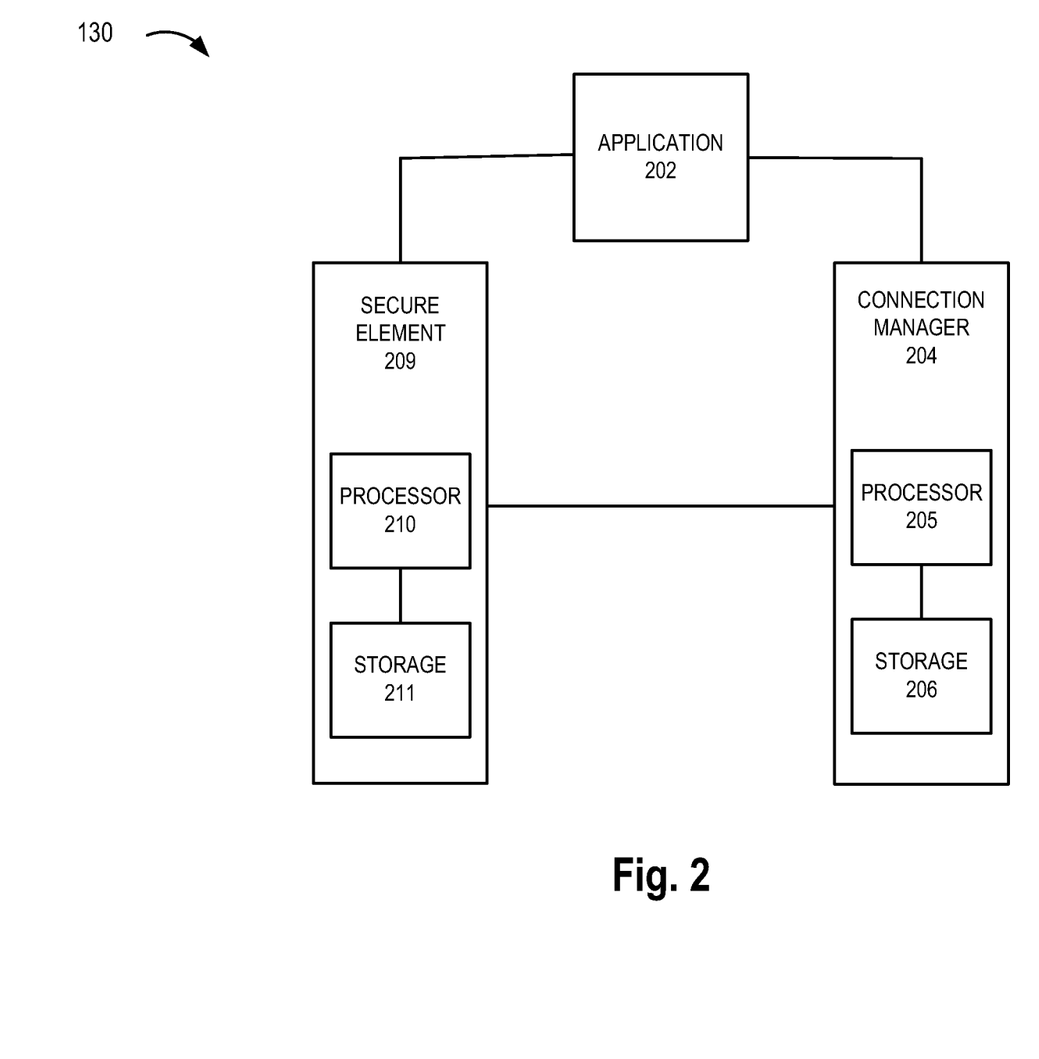
FIG. 2 is a diagram illustrating another exemplary environment in which an exemplary embodiment of the application authorization service may be implemented.

FIG. 2 is a diagram illustrating exemplary components included in end device 130 that may provide an exemplary embodiment of the application authorization service. As illustrated, end device 130 may include an application 202, a connection manager 204, and a secure element 209.

Application 202 may include software, such as a mobile application or application software configured to operate on end device 130. As an example, application 202 may be an AR application, a navigation application, or another type of application, as described herein.

Connection manager 204 may include a component that provides one or more functions and/or procedures of an exemplary embodiment of the application authorization service. According to various exemplary implementations, connection manager 204 may be implemented in or as a modem, a baseband chip, UE Route Selection Policy (URSP) logic, or another element that may enforce URSP rules and/or manage access and/or establishment of network connections by end device 130 with a network (e.g., access network 105, external network 115, core network 120). According to other exemplary implementations, connection manager 204 may, in whole or in part, be implemented in the operating system (OS) of end device 130. As illustrated, connection manager 204 may include a processor 205 and a storage 206.

Secure element 209 may include a trusted execution environment (TEE) within which one or more functions and/or procedures of an exemplary embodiment of the application authorization service may be performed. According to various exemplary implementations, secure element 209 may be implemented in a card, such as a subscriber identification module (SIM) card, an embedded SIM (eSIM) card/chip, a Universal Integrated Circuit Card (UICC), an embedded UICC, or another type of component, such as a secure enclave (SE), an integrated trusted execution environment (TEE), a chip or the like, which may include hardware, software, firmware, an operating system (OS), and/or other types of data, information, or the like. As illustrated, secure element 209 may include a processor 210 and a storage 211.

The components of end device 130 that provide the application authorization service are exemplary. According to other exemplary embodiments, end device 130 may include additional, different, and/or fewer components. Additionally, for example, according to other exemplary embodiments, multiple components may be combined into a single component. For example, connection manager 204 may be implemented to include secure element 209, in whole or in part, or vice versa.

Figure 3A:
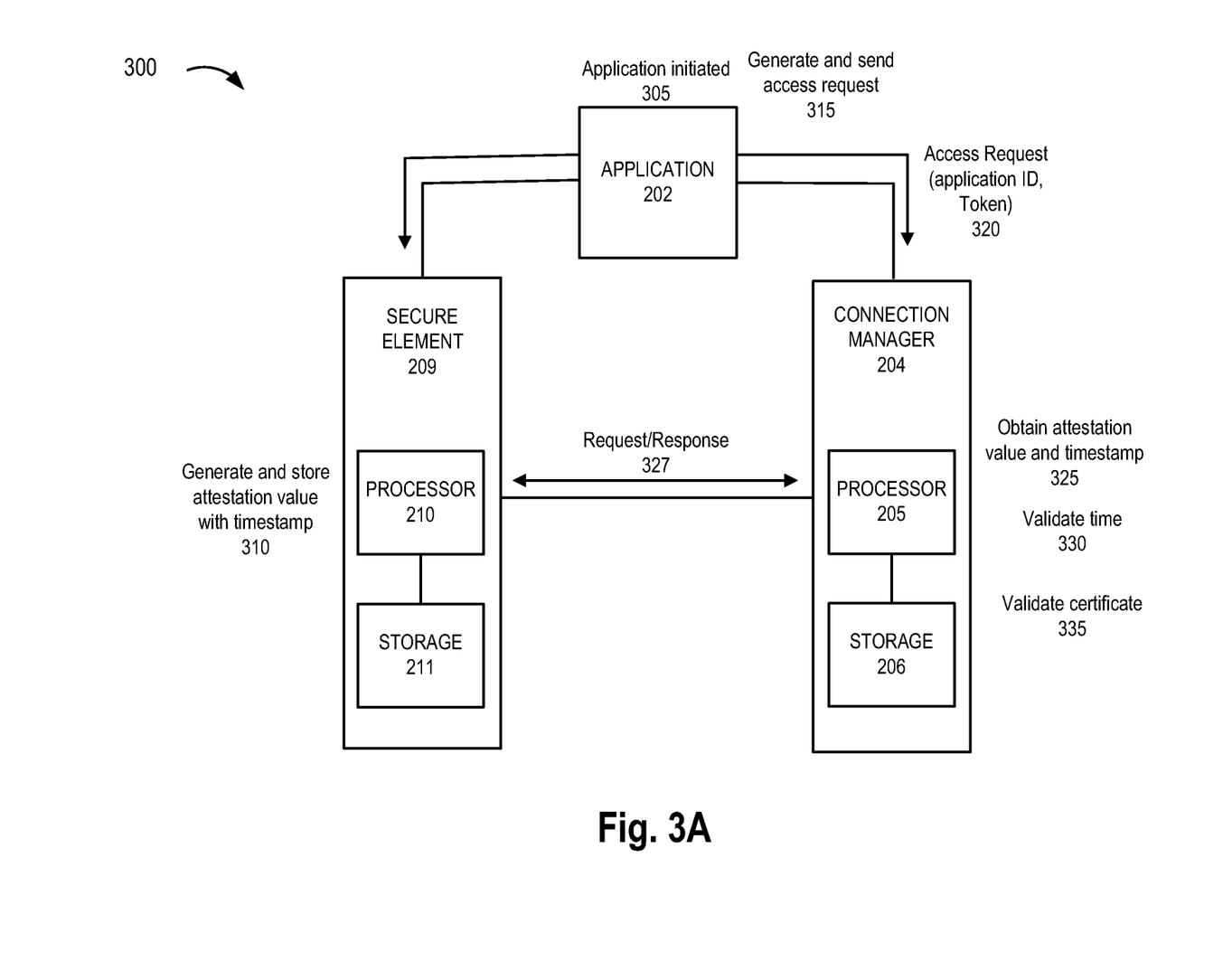
FIGS. 3A and 3B are diagrams illustrating an exemplary process of an exemplary embodiment of the application authorization service according to an exemplary scenario.
Figure 3B:
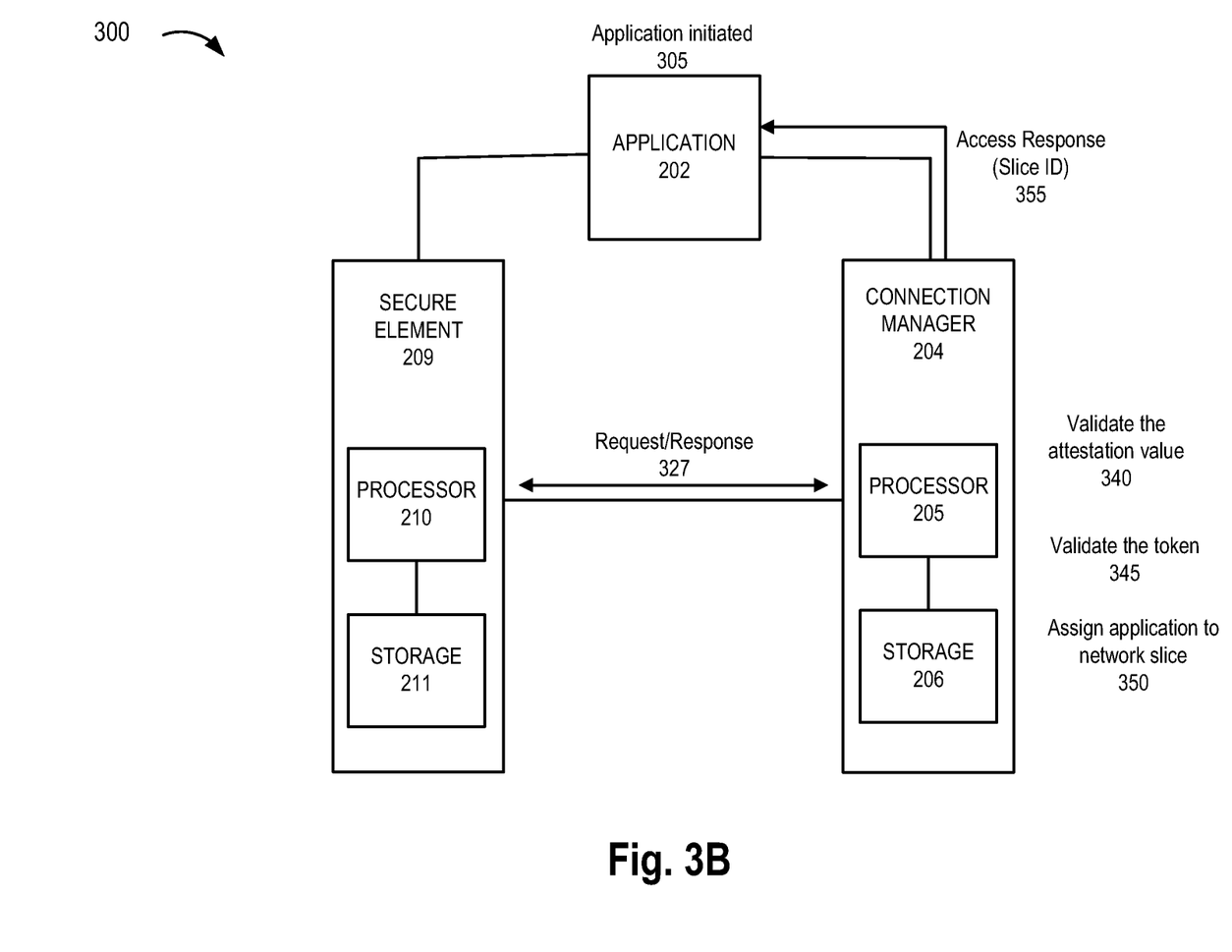

FIGS. 3A and 3B are diagrams illustrating an exemplary process 300 of an exemplary embodiment of the application authorization service according to an exemplary scenario. For purposes of description, process 300 is described in relation to exemplary components depicted in FIG. 2.

Referring to FIG. 3A, process 300 may include that an application is initiated 305. For example, a user (not illustrated) may launch the application of end device 130 by tapping on an icon of the application. In response, before loading the application into memory, secure element 209 may be notified and, in response, generate and store an attestation value and a timestamp 310. For example, the application may provide its application identifier to processor 210 and processor 210 may generate the attestation value based on the application code or binary that is to be loaded in memory. By way of example, the attestation value may be a hashed value of the application code or a binary file (e.g., .exe file, .bin file, .dll file, or the like file) of the application. In this way, the attestation value may be generated before the application is loaded in memory (e.g., the application may be stored in storage versus memory of end device 130). Processor 210 may store the attestation value in storage 211. Processor 210 may store one or multiple timestamps, as described herein, in storage 211.

Figure 4:
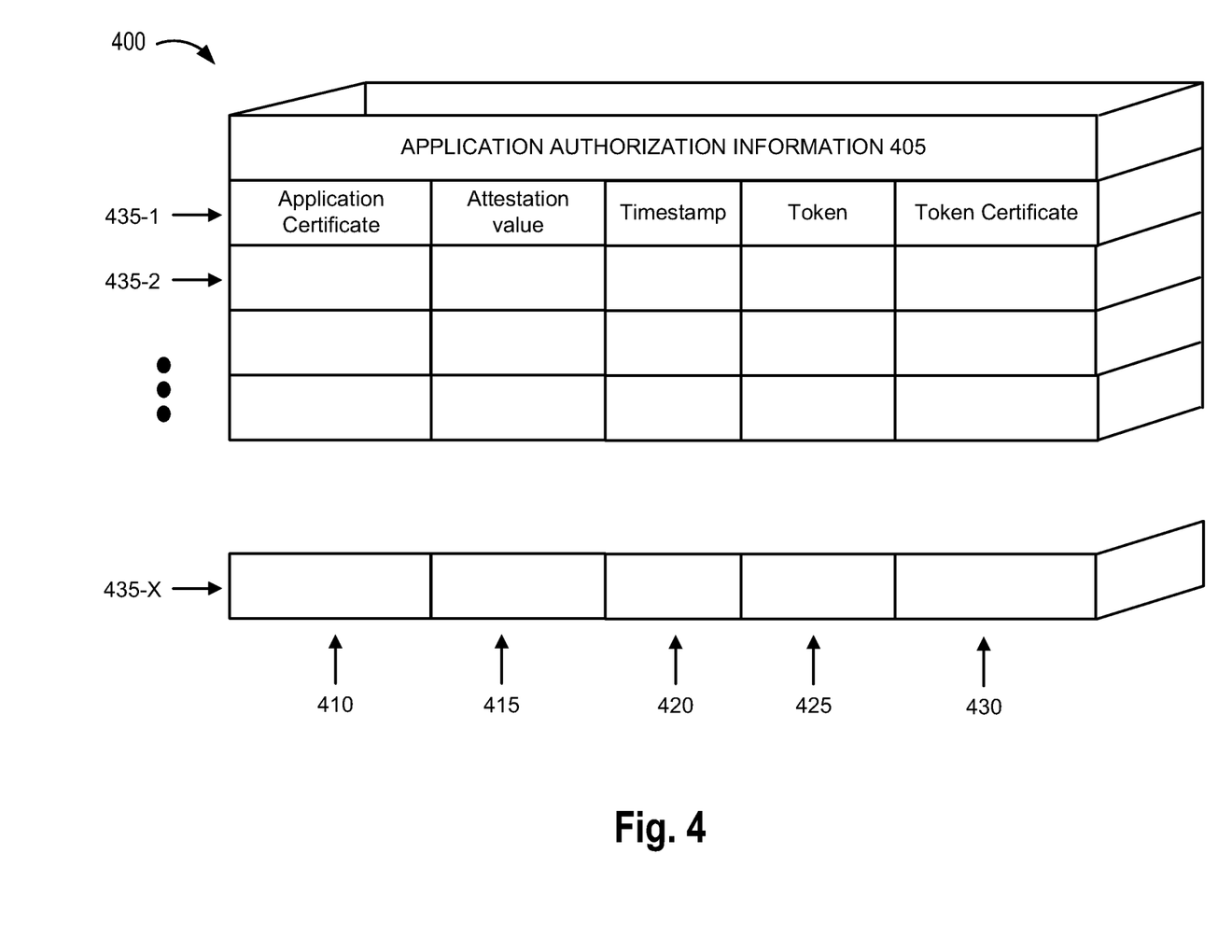
FIG. 4 is a diagram illustrating exemplary information of an exemplary embodiment of the application authorization service.

For example, FIG. 4 is a diagram illustrating exemplary information of an exemplary embodiment of the application authorization service. As illustrated, a table 400 may store application authorization information 405. For example, application authorization information 405 may include an application certificate field 410, an attestation field 415, a timestamp field 420, a token field 425, and a token certificate field 430. As further illustrated, application authorization information 405 may include mappings or records 435-1 through 435-X (also referred to collectively as mappings 435 or individually or generally as mapping 435) that correlate fields 410 through 430. The fields and respective values described are merely exemplary. Storage 211 may store table 400.

Prioritization information 405 is illustrated in tabular form merely for the sake of description. According to other implementations, prioritization information 405 may be implemented in a data structure different from a table (e.g., a list, a flat file, etc.), in a database, or another type of storage element.

Application certificate field 410 may store certificate data pertaining to an application. As an example, the certificate data may include an alphanumeric string. The certificate data may include an application identifier associated with the application. The certificate data may include other types of data, such as an attestation value, an expiration date of the certificate, certificate authority data (e.g., signature, issuer, etc.), and/or other values that may relate to a policy, key usage, scope, and so forth. The certificate data may be provisioned or obtained from a trusted entity. Application certificate field 410 may store certificate chains associated with the certificate authority.

Attestation field 415 may store data that indicates that the application relates to or owns the application identifier and the certificate. As an example, the data may include an attestation value. The attestation value may be a hashed value of the application code, binary file, and/or another type of executable file associated with the application. In this way, the attestation value may provide a unique signature of the application. According to some exemplary embodiments, the attestation value may be generated before the loading of the application into memory (e.g., from storage) of end device 130. According to other exemplary embodiments, the attestation value may be generated during or after the loading of the application to memory of end device 130.

Timestamp field 420 may store a date and a time value, such as a timestamp value. The timestamp value may relate to when the attestation value was generated and/or when an application is launched or initially executed.

Token field 425 may store data that indicates authorization of an application regarding a network slice and/or non-network slice network connectivity. For example, the data may include a token. The token may include data indicating a network slice identifier of a network slice (e.g., NSSAI, a Single NSSAI (S-NSSAI)), QoS information (e.g., a 5QI or the like), a combination of both (e.g., network slice identifier and corresponding 5QI), and/or other information pertaining to a non-network slice network connection (e.g., parameters relating to security, service level agreement (SLA) requirements, QoS, or the like, an application identifier of the application, an application type of the application (e.g., communication service (e.g., text, email, etc.), VR, video streaming, or another type of application category). The token may include other values that may relate to the issuer, scope, expiration, and so forth. The stored token may be provisioned or obtained from a trusted entity (e.g., network operator or the like).

Token certificate field 430 may certificate data pertaining to a token. As an example, the token certificate data may include an alphanumeric string. The token certificate data may include an application identifier associated with the application. The token certificate data may include other types of data, an expiration date of the certificate, certificate authority data (e.g., signature, issuer, etc.), and/or other values that may relate to a policy, key usage, scope, and so forth. The token certificate data may be provisioned or obtained from a trusted entity (e.g., a network operator or the like).

According to other exemplary implementation, table 400 may store additional, fewer, and/or different instances of application authorization information 405 in support of the application authorization service. For example, table 400 may include a field that stores an application identifier of an application.

Referring back to FIG. 3A, as an example, the attestation value and the timestamp(s) may be stored in fields 415 and 420 of storage 211. In further response to the launching of the application, application 202 may generate and send an access request 315 to connection manager 204. For example, the access request may include an application identifier and a token (e.g., authorization token).

In response to receiving the access request, connection manager 204 may perform procedures of the application authorization service. For example, connection manager 204 may perform an application certificate validation procedure, an application attestation procedure, and/or a token validation procedure, in whole or in part, depending on the result of the procedure or a step (among multiple steps) of the procedure. While a step and/or a procedure of the application authorization service may be described in relation to process 300, the order of performance of the step and/or the procedure is/are exemplary. According to other exemplary embodiments, the step and/or the procedure described and illustrated in FIGS. 3A and 3B may be different. For example, a non-dependent step or procedure may be performed concurrently relative to another step or procedure, or may be performed in a different order. According to an exemplary embodiment, a negative result associated with the step or the procedure may cause the access request to be denied by connection manager 204. For example, connection manager 204 may not grant authorization to establish a network connection via a network slice or establish a non-network slice connection with the network (e.g., access network 105 and, core network 120 and/or external network 115).

Referring to FIG. 3A, in response to receiving the access request, connection manager 204 may obtain the attestation value and the timestamp 325 associated with application 202. For example, connection manager 204 may transmit a request that includes the application identifier provided by application 202 in the access request, and obtain from secure element 209 (e.g., storage 211) based on request/response 327 signaling. As illustrated, connection manager 204 may determine whether the access request is current relative to the timestamp value, such as validate time 330. For example, connection manager 204 may compare the time of receipt of the access request to the timestamp of when the attestation value was generated and/or when application 202 was initially executed. Based on a result of the comparison, connection manager 204 may determine whether the time is valid. As an example, connection manager 204 may compare the time difference to a time threshold value that indicates a maximum time period that is allowable or a time threshold value that, when satisfied, is not allowable. According to other exemplary embodiments, when the attestation value is not stored in storage 211 and/or the timestamp of the attestation value obtained has expired, connection manager 204 may request that a current or new attestation value be generated by processor 210 along with the corresponding timestamp. For example, processor 210 may find the application code, binary file, or the like in memory (e.g., the application may be loaded into memory) and generate the hashed value. According to this exemplary scenario, assume that the time is successfully validated and determined to be valid.

Based on the time validation (or not), connection manager 204 may validate the certificate 335. For example, based on request/response 327 signaling, connection manager 204 may obtain the certificate of application 202 from storage 211 (e.g., table 400). Connection manager 335 may compare the application identifier provided in the access request to the application identifier included in the certificate. Connection manager 335 may also determine whether the certificate is expired and inspect other values included in the certificate (e.g., the CA, etc.). When the application identifiers match, the certificate is not expired, and the certificate is issued/signed by a recognized entity, connection manager 335 may determine that the certificate is valid. When the application identifiers do not match, the certificate is expired, and/or the certificate is not issued/signed by a recognized entity, connection manager 335 may not determine that the certificate is valid.

Referring to FIG. 3B, based on the certificate validation (or not), connection manager 204 may validate the attestation value 340. For example, connection manager 204 may compare the attestation value obtained from secure element 209 to the attestation value included in the certificate. Based on a result of the comparison, connection manager 204 may determine whether the attestation value is valid. For example, when the attestation values match, connection manager 204 may determine that the attestation value is valid, and when they do not match, connection manager 204 may determine that the attestation value is invalid.

Based on the attestation value validation (or not), connection manager 204 may validate a token 345. For example, based on request/response 327 signaling, connection manager 204 may obtain the token and the token certificate of application 202 from storage 211 (e.g., table 400). Connection manager 204 may compare the token provided in the access request to the token obtained from secure element 209. Connection manager 335 may also determine whether the token certificate is expired and inspect other values included in the certificate (e.g., the CA, etc.). When the tokens match, the token certificate is not expired, and the token certificate is issued/signed by a recognized entity, connection manager 335 may determine that the token provided by application 202 is valid. When the tokens do not match, the token certificate is expired, and/or the token certificate is not issued/signed by a recognized entity, connection manager 335 may not determine that the token included in the access request is not valid.

Based on the successful validation of the token (or not), connection manager 204 may assign application 202 to an appropriate network slice. For example, the token may include NSSAI or S-NSSAI that pertains to application 202 and/or the application identifier of application 202. Connection manager 204 may also identify a URSP rule that relates to application 202. Connection manager 204 may transmit an access response 355 to application 202. For example, access response 355 may include a network slice identifier. According to other exemplary scenarios, access response 355 may not include the network slice identifier. For example, application 202 may not be entitled to access and use of a network slice but a non-network slice connection. Thereafter, although not shown, application 202 may establish a network connection via a network slice or not with the network. For example, end device 130 may establish an application session with external device 117 via access device 107 or access device 107 and core device 122.

FIGS. 3A and 3B illustrate process 300 according to an exemplary scenario, however according to other exemplary scenarios and/or embodiments, process 300 may include additional, different, and/or fewer steps or operations pertaining to the application authorization service, as described herein.

Figure 5:
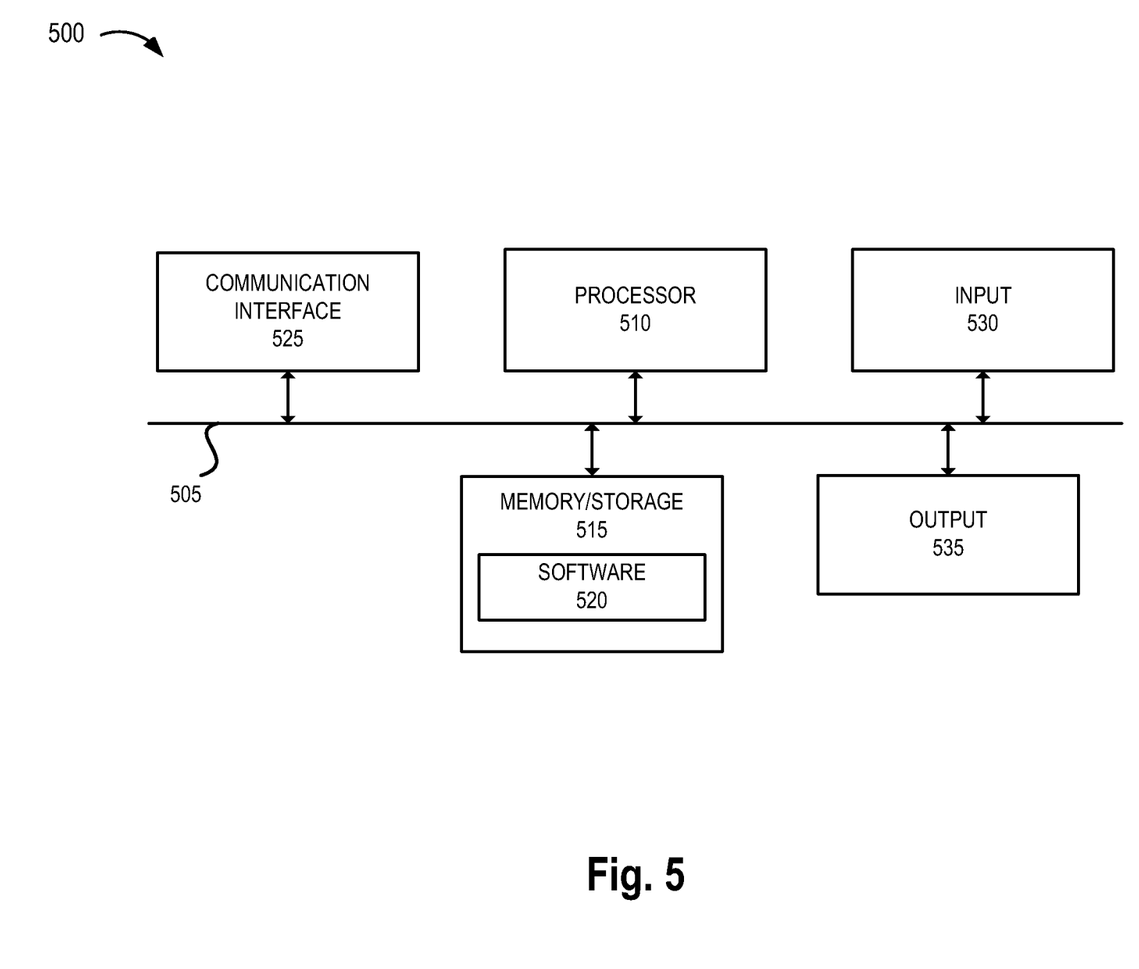
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc. According to some exemplary embodiments, end device 130 may include a main or primary processor, such as processor 510, and one or multiple secondary processors, such as processor 205 and 210, as described herein. Processor 205 and/or processor 210 may be implemented in a similar manner as processor 510 with consideration of the differences in load, among other factors, relative to processor 510. According to other exemplary embodiments, dedicated and/or shared processor may be implemented differently.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500. According to some exemplary embodiments, end device 130 may include a main or primary memory/storage, such as memory/storage 515, and one or multiple secondary memories/storages, such as storage 206 and storage 211, as described herein. Storage 206 and/or storage 211 may be implemented in a similar manner as memory/storage 515 with consideration of the differences in storing capacity, speed, among other factors, relative to memory/storage 515. According to other exemplary embodiments, dedicated and/or shared memory/storage may be implemented differently.

Software 520 includes an application or a program that provides a function and/or a process. As an example, with reference to end device 130, software 520 may include an application that, when executed by processor 510, provides a function and/or a process of the application authorization service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.). Connection manager 204 and secure element 209 may include software 520. Software 520 may include application 202, as described herein.

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard. Communication interface 525 may support one or multiple transmission/reception configurations.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 500 may be configured to perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 may be configured to perform a function or a process described herein based on the execution of hardware (processor 510, etc.).

Figure 6A:
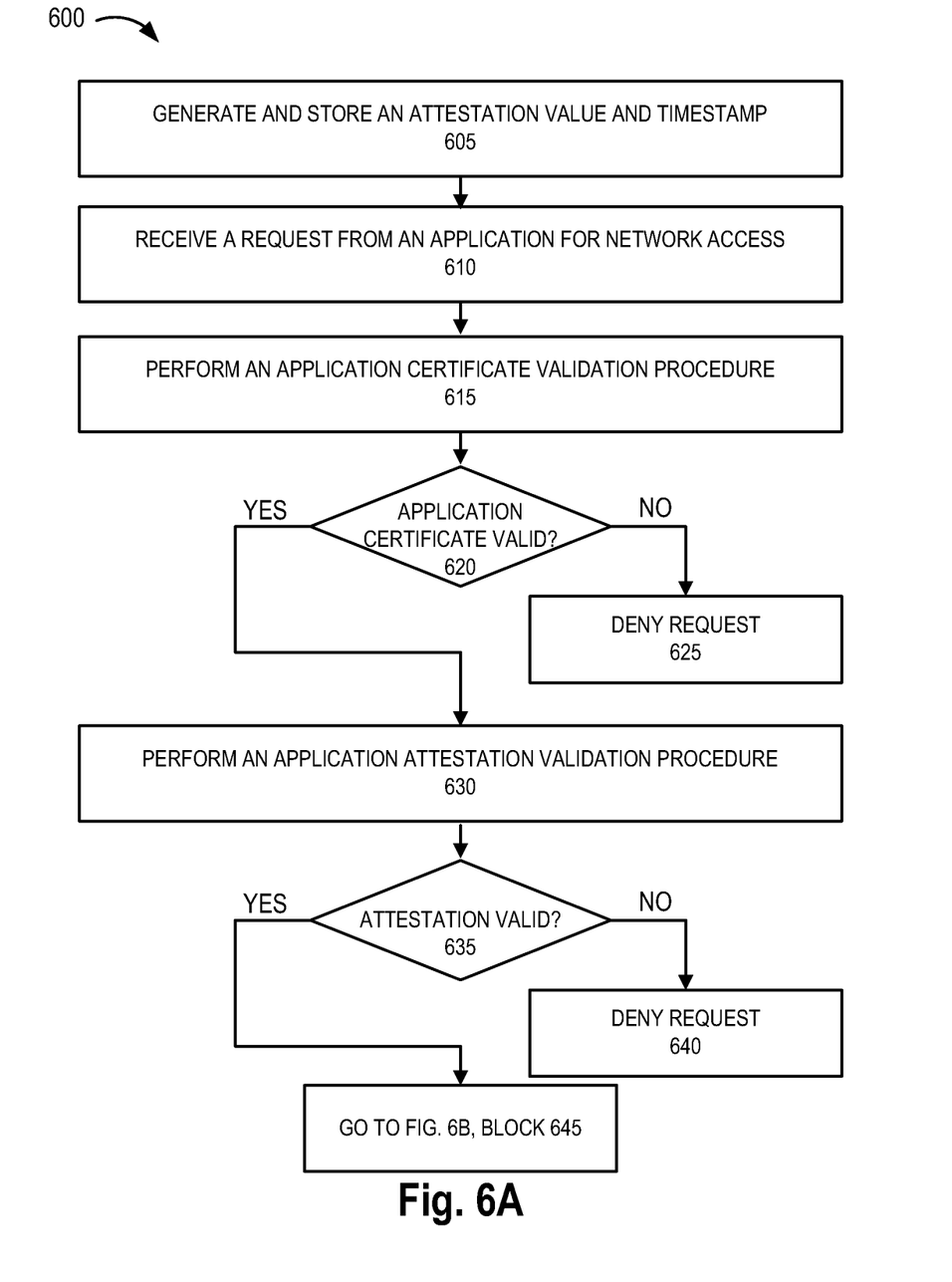
FIGS. 6A and 6B are flow diagrams illustrating an exemplary process of an exemplary embodiment of the application authorization service.
Figure 6B:
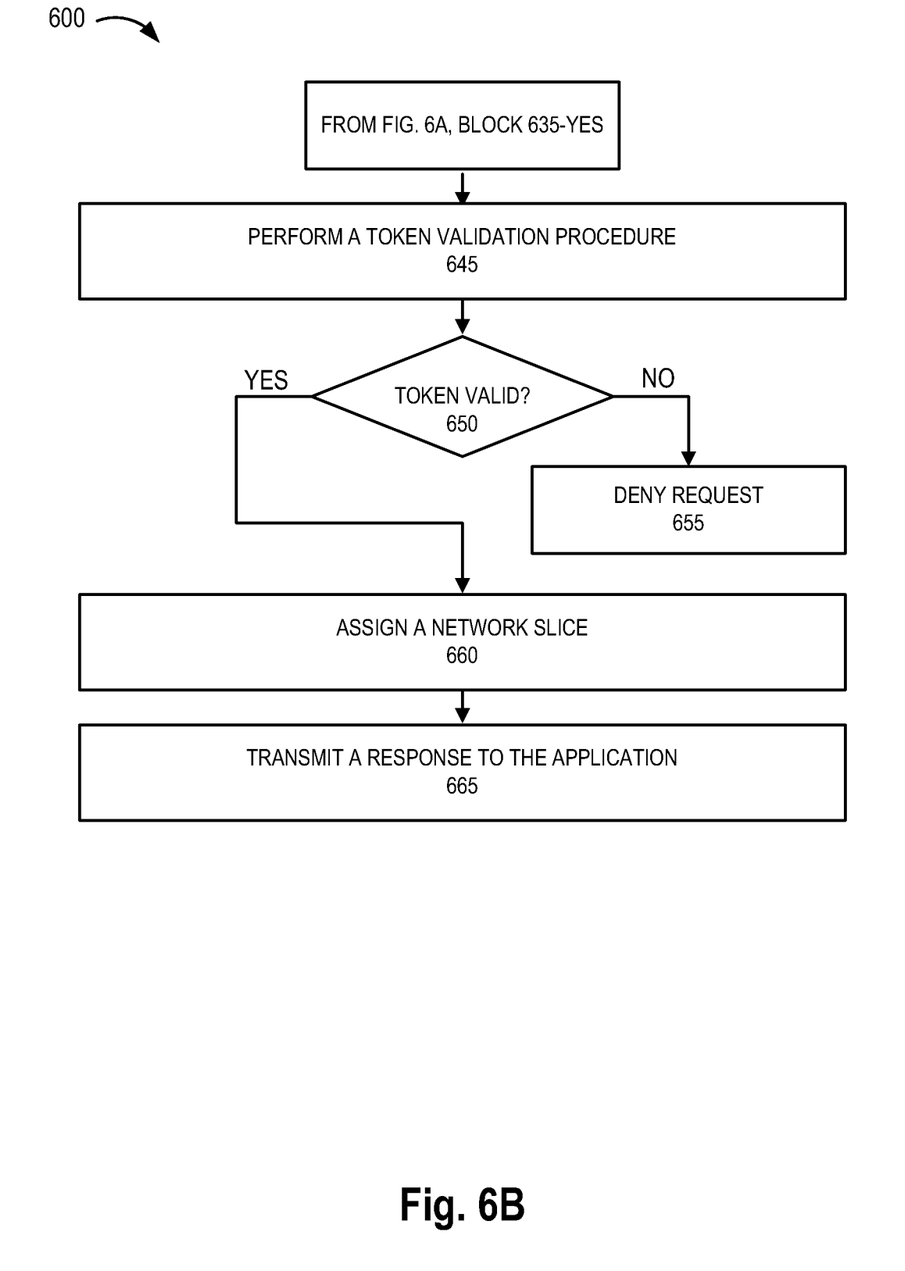

FIGS. 6A and 6B are flow diagrams illustrating an exemplary process 600 of an exemplary embodiment of the application authorization service. According to an exemplary embodiment, end device 130 may perform process 600. According to an exemplary implementation, processor 510 executes software 520 to perform a step (in whole or in part) of process 600, as described herein. Alternatively, a step (in whole or in part) may be performed by execution of only hardware. While a component or components of end device 130, such as connection manager 204 and secure element 209, may perform a step or a procedure of process 600, for the sake of simplicity, process 600 is described as being performed by end device 130.

Referring to FIG. 6A, in block 605, end device 10 may generate and store an attestation value and a timestamp. For example, in response to a startup or launch of application 202, end device 130 may generate the attestation value, as described herein. The timestamp value may be the date and time of the startup or launch of application 202 and/or when the attestation value is generated.

In block 610, end device 130 may receive a request from an application for network access. For example, after startup or launch of application 202, application 202 may request network access to establish an application session. The request may include an application identifier. The request may include a token. End device 130 may obtain and compare the timestamp value to a current date and time value and determine whether the timestamp value is within a time period, as described herein. If it is, process 600 may proceed to block 615, otherwise, process 600 may end. For example, end device 130 may deny the request. Alternatively, end device 130 may request a new attestation value of the application that was started or launched.

In block 615, end device 130 may perform an application certificate validation procedure, as described herein. For example, end device 130 may obtain an application certificate based on the application identifier or other information from a secure storage. End device 130 may compare application identifiers and information included in the application certificate, as described herein.

In block 620, end device 130 may determine whether the application certificate is valid. When end device 130 determines that the application certificate is not valid (block 620—NO), end device 130 may deny the request (block 625). When end device 130 determines that the application certificate is valid (block 620—YES), end device 130 may perform an application attestation validation procedure (block 630), as described herein. For example, end device 130 may obtain and compare the attestation value stored in the secured storage to an attestation value included in the application certificate. In certain cases, if there is no "current" attestation value stored in the secured storage then end device 130 may request or invoke another attestation procedure and generate a current attestation value. End device 130 may perform the attestation validation procedure relative to the current attestation value.

In block 635, end device 130 may determine whether the attestation is valid. When end device 130 determines that the attestation is not valid (block 635—NO), end device 130 may deny the request (block 640). When end device 130 determines that the attestation is valid (block 635—YES), end device 130 may perform a token validation procedure (block 645), as illustrated in FIG. 6B. For example, end device 130 may obtain and compare a token stored in the secured storage to the token included in the request from application 202. End device 130 may further verify a token certificate, as described herein. The token validation procedure may include validating that the application identifier within the token matches the application identifier that was included in the request by the application or the application identifier within the application certificate.

In block 650, end device 130 may determine whether the token is valid. When end device 130 determines that the token is not valid (block 650—NO), end device 130 may deny the request (block 655). When end device 130 determines that the token is valid (block 650—YES), end device 130 may assign a network slice to the request of the application (block 660). In block 665, end device 130 may transmit a response to the application. For example, the response may include a network slice identifier, as described herein.

FIGS. 6A and 6B illustrate an exemplary process 600 of the application authorization service, however, according to other exemplary embodiments, the application authorization service may perform additional operations, fewer operations, and/or different operations than those illustrated and described in relation to FIGS. 6A and 6B. For example, according to some exemplary embodiments, process 600 may omit blocks 645 and 650. By way of further example, after successfully validating the application certificate and the attestation value, end device 130 may assign a network slice to application 202 or grant a non-network slice connection, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 6A and 6B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    generating, by an end device in response to a launch of an application of the end device, a first value pertaining to the application;
    receiving, by the end device from the application in response to the launch, a request for network access;
    determining, by the end device in response to the request, whether an application certificate relating to the application is valid;
    determining, by the end device in response to the request, whether a second value that corresponds to the first value match, wherein the second value is included in the application certificate; and
    determining, by the end device, to grant network access to the application based on determining that the application certificate is valid and that the first value and the second value match.

2. The method of claim 1, further comprising:
    receiving, by the end device from the application, an application identifier, and wherein the first value is generated based on an executable file of the application.

3. The method of claim 1, wherein the request includes an application identifier of the application and a first token.

4. The method of claim 3, wherein the application certificate is validated based on the application identifier included in the request and a corresponding application identifier included in the application certificate.

5. The method of claim 3, further comprising:
    determining, by the end device, that the first token is valid based on a comparison to a second token and a token certificate of the second token, wherein the second token and the token certificate are stored prior to the generating.

6. The method of claim 3, further comprising:
    denying, by the end device, the request when at least the application certificate is determined not valid or the first token and a second token do not match.

7. The method of claim 1, further comprising:
    assigning, by the end device, a network slice identifier to the application based on a validated token.

8. The method of claim 1, wherein the application certificate and the first value are stored in a trusted execution environment of the end device.

9. An end device comprising:
    a processor, wherein the processor is configured to:
        generate, in response to a launch of an application of the end device, a first value pertaining to the application;
        receive, in response to the launch from the application, a request for network access;
        determine, in response to the request, whether an application certificate relating to the application is valid;
        determine, in response to the request, whether a second value that corresponds to the first value match, wherein the second value is included in the application certificate; and
        determine to grant network access to the application based on determining that the application certificate is valid and that the first value and the second value match.

10. The end device of claim 9, wherein the processor is further configured to:
    receive from the application, an application identifier, and wherein the first value is generated based on an executable file of the application.

11. The end device of claim 9, wherein the request includes an application identifier of the application and a first token.

12. The end device of claim 11, wherein the application certificate is validated based on the application identifier included in the request and a corresponding application identifier included in the application certificate.

13. The end device of claim 11, wherein the processor is further configured to:
    determine that the first token is valid based on a comparison to a second token and a token certificate of the second token, wherein the second token and the token certificate are stored prior to the generation of the first value.

14. The end device of claim 9, wherein the processor is further configured to:
    deny the request when at least the application certificate is determined not valid or the first token and a second token do not match.

15. The end device of claim 9, wherein the processor is further configured to:
    assign a network slice identifier to the application based on a validated token.

16. The end device of claim 9, wherein the application certificate and the first value are stored in a trusted execution environment of the end device.

17. A non-transitory computer-readable storage medium storing instructions executable by a processor of an end device, wherein the instructions are configured to:
    generate, in response to a launch of an application of the end device, a first value pertaining to the application;
    receive, in response to the launch from the application, a request for network access;
    determine, in response to the request, whether an application certificate relating to the application is valid;
    determine, in response to the request, whether a second value that corresponds to the first value match, wherein the second value is included in the application certificate; and
    determine to grant network access to the application based on determining that the application certificate is valid and that the first value and the second value match.

18. The non-transitory computer-readable storage medium of claim 17, wherein the request includes an application identifier of the application and a first token.

19. The non-transitory computer-readable storage medium of claim 18, wherein the instructions are further configured to:
   determine that the first token is valid based on a comparison to a second token and a token certificate of the second token, wherein the second token and the token certificate are stored prior to the generation of the first value.

20. The non-transitory computer-readable storage medium of claim 18, wherein the instructions are further configured to:
   deny the request when at least the application certificate is determined not valid or the first token and a second token do not match.

\* \* \* \* \*